United States Patent [19]

Yoritomi et al.

[11] 4,267,054
[45] May 12, 1981

[54] METHOD FOR THE CHROMATOGRAPHIC SEPARATION OF SOLUBLE COMPONENTS IN FEED SOLUTION

[75] Inventors: Kenzaburo Yoritomi; Teruo Kezuka; Mitsumasa Moriya, all of Chiba, Japan

[73] Assignee: Sanmatsu Kogyo Co., Ltd., Tokyo, Japan

[21] Appl. No.: 32,723

[22] Filed: Apr. 23, 1979

Related U.S. Application Data

[63] Continuation-in-part of Ser. No. 908,455, May 22, 1978.

[30] Foreign Application Priority Data

May 26, 1977 [JP] Japan .................................. 52/62023

[51] Int. Cl.³ .............................................. B01D 15/08
[52] U.S. Cl. .................................................... 210/659
[58] Field of Search .............. 210/31 C; 127/24, 46 R, 127/46 A

[56] References Cited

U.S. PATENT DOCUMENTS

| | | | |
|---|---|---|---|
| 2,985,589 | 5/1961 | Broughton et al. | 210/34 |
| 3,686,117 | 8/1972 | Laura et al. | 210/31 C |
| 3,706,812 | 12/1972 | Rosset | 260/674 SA |
| 3,715,400 | 2/1973 | Broughton | 260/674 SA |
| 4,031,155 | 6/1977 | Heazy et al. | 210/31 C |
| 4,155,846 | 5/1979 | Novak et al. | 201/31 C |
| 4,157,267 | 6/1979 | Odawara et al. | 210/31 C |

*Primary Examiner*—John Adee
*Attorney, Agent, or Firm*—Wegner & Bretschneider

[57] ABSTRACT

An improved method is disclosed for the chromatographic separation of soluble components from a multicomponent mixture wherein a feed solution of the multicomponent mixture and a desorbent are sequentially fed under predetermined conditions into column(s) packed with a solid adsorbent.

5 Claims, 5 Drawing Figures

METHOD FOR THE CHROMATOGRAPHIC SEPARATION OF SOLUBLE COMPONENTS IN FEED SOLUTION

This application is a continuation-in-part application of copending application Ser. No. 908,455 filed May 22, 1978.

FIELD OF THE INVENTION

The present invention relates to a method for the chromatographic separation of soluble components from a multicomponent mixture.

BACKGROUND OF THE INVENTION

In the past, column chromatography has been used for the separation of many kinds of multicomponent solution using a column packed with a solid adsorbent having selective adsorbency such as ion exchange resin or molecular sieves.

In recent years, such column chromatography has been increasingly used on a large scale in many industrial fields, for example, in the food industrial field for the separation of fructose and glucose from invert sugar solutions or high fructose corn syrup solutions by using cation exchange resins in the calcium form, for the separation of maltose and beta-limit dextrin from starch hydrolyzates, in the petroleum industrial field for the separation of normal-parraffins and isoparaffins by using a solid adsorbent containing aluminosilicate, and in other industries for the recovery of copper and ammonium, separaton of nucleic acid, softening water, and recovery of glutamic acid, etc.

However, the following problems arise when conducting industrial chromatographic separation processes on a large scale.

(1) The length of the column must be long enough to enable sufficient separation of the soluble components, but there are some restrictions in using a long column for feasible industrial separation; therefore, it is necessary that the feed solution containing multiple components can be separated into pure separate components by using a relatively short length column.

(2) Generally, dilution of separated soluble components with desorbent can not be avoided.

Especially in the conventional batchwise process of chromatographic separation, the leading edge portion and the tailing edge portion of a separation zone are diluted; accordingly each fraction which contains a completely recovered component is too dilute, causing the disadvantage of having to remove desorbent from each fraction by evaporation, which requires a large amount of fuel and high operating costs.

Heretofore, to solve those problems mentioned above several methods have been provided. One of those methods, the simulating moving bed process (Japanese Patent Publication No. 51-18,392 or Japanese Patent Open-Laid No. 51-101,140) has the following disadvantages: the column must have a very complex structure and the operation of this process requires technically highly complicated control by using a computer. Another method, the moving bed system (Japanese Patent Publication No. 46-18214) has several problems such as difficulty in moving adsorbent without disturbing separation also the reliability of separation is questionable.

BRIEF SUMMARY OF THE INVENTION

We have found that the problems mentioned above can be solved by the combined operation of the processes described below:

(1) As the feed solution (for ease of discussion, we refer to a solution containing components A and B herein) can not be completely separated into a pure A fraction and a pure B fraction by using a relatively short length column, a contaminated fraction which flows out of the bottom of the column, and contains both of the components A and B but with an incremental increase in component B, is returned directly to the top of the column for more complete separation.

(2) Then, a diluted fraction from the tailing edge portion of the component B (which follows after the fraction rich in component B) along with the leading edge portion of the component A (which comes before the fraction rich in the component A in the next cycle) is directly recycled to the top of the column.

(3) The feed solution and desorbent are introduced into the column through specially located inlets, positioned so selected that the liquid composition (the concentration distribution) of the stream moving in the column is not interrupted.

(4) Processes (1), (2), and (3) above are carried out in a circulating system.

The present invention is based on the above-mentioned findings.

Thus, it is an object of the present invention to provide a method for chromatographic separation wherein each of the separated components is obtained in high concentration without undue dilution by using a column or columns of restricted length.

It is a further object of this invention to provide a method for chromatographic separation which requires no complex structure or complicated operation.

Other objects of the present invention will become apparent from reviewing the following detailed description.

According to the present invention, the efficient chromatographic separation and selective recovery of the main components with the desirable liquid concentration have been achieved by using a column which has a simple structure, and moreover the column is operated using a small number of valves. This will be explained in more detail infra).

BRIEF DESCRIPTION OF THE DRAWING

In the accompanying drawings:

In FIG. 2, I represents the concentration distribution in the column at the beginning of outflow of the (a) fraction, II is the concentration distribution in the column at the end of outflow of the (a) fraction, III is the concentration distribution in the column at the beginning of outflow of the (c) fraction, and IV is the concentration distribution in the column at the end of outflow of the (c) fraction, respectively;

DETAILED DESCRIPTION OF THE INVENTION

Figure 1:
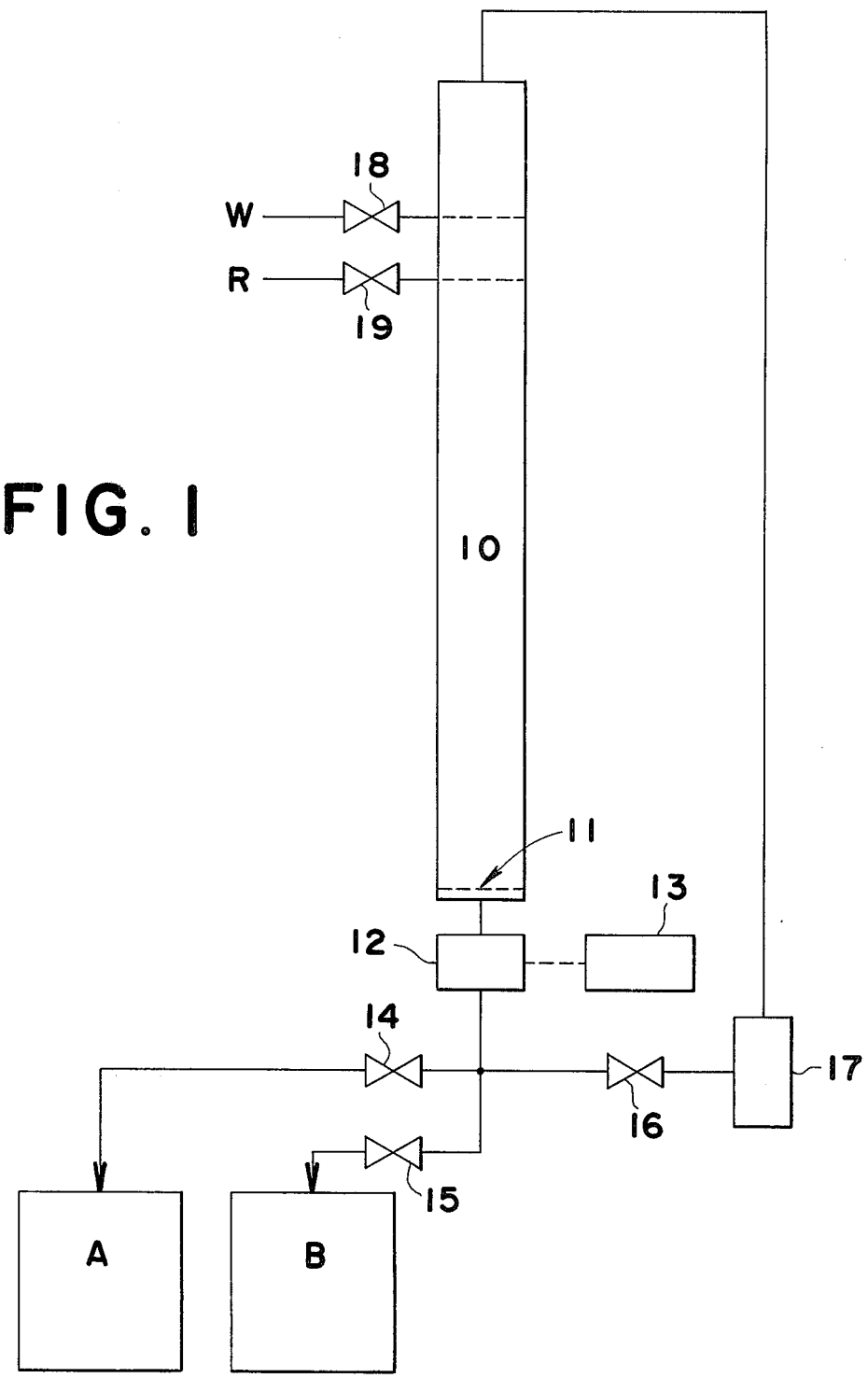
FIG. 1 is a diagrammatic view of the apparatus used in Example 1.

The present invention will now be explained in more clearly. For the purpose of simplifying this description, the separation of fructose and glucose from an invert sugar solution which contains glucose (component A) and fructose (component B) in equal proportions by using a cation exchange resin in calcium form will be described.

However, it should be understood that by describing this particular separation it is not intended to limit the scope of the invention which is applicable to all such chromatographic separations.

In the past, there have been a number of improved methods for the separation of fructose (component B) from a solution containing a mixture of glucose (component A) and fructose (component B) based on the principle described in U.S. Pat. No. 3,044,904 which involves the separation of fructose using a cation exchange resin as the adsorbent.

U.S. Pat. No. 3,692,582 also describes one of those methods. The method in that patent calls for alternatively admitting the feed solution containing components A and B and water to the top of the column packed with cation exchange resin in calcium form; then the feed solution carried along with the water stream is chromatographically separated, first to be separated is the component A-rich fraction, next is a mixed fraction, and at last the component B-rich fraction flows out of the bottom of the column sequentially. The components or fractions are separately collected, and the mixed fraction is stored and reserved as feed solution to be separated in the next cycle.

Though this method permits one to separate the two components A and B by using a relatively short length column the process gives rise to the following disadvantages: As mentioned previously, the component A-rich fraction and the component B-rich fraction require a lot of desorbent for complete recovery of each component in each fraction.

Furthermore the mixed fraction which flows out of the column as its liquid composition is sequentially changing from the component A-rich fraction to the component B-rich fraction is used only as the feed solution which will be separated in the next cycle, that is, the mixed fraction which is already partially separated is not used efficiently in this process, because the operations of storing and then mixing the mixed fraction with fresh feed solution are opposite to the principal purpose of separation of the components.

To solve those problems mentioned above, the concentration distribution in the column is controlled by the following operations:

(1) In order to obtain satisfactory separation by using a relatively short column, the mixed fraction which has not been separated sufficiently is recycled without storing, allowing more complete separation to be obtained.

(2) As water and the feed solution cannot be admitted to the column during the recycling above described, admission of water and the feed solution should be carried out during the time when either the component A-rich fraction or the component B-rich fraction is discharged.

(3) Admitting of water and the feed solution and discharging of the component A-rich fraction or the component B-rich fraction should be carried out at the same time, wherein each inlet position for water and the feed solution is so located that the concentration distribution of the stream displacing in the column is not materially disturbed.

The position of the inlet for the feed solution is selected to be that point on the column wherein the liquid composition (the concentration distribution) of the stream moving in the column shows a maximum concentration or wherein the ratio of the components A to B in the stream in the column is substantially equal to that of the feed solution.

The position of the inlet for water is selected as that point on the column where the liquid composition of the stream in the column shows the lowest concentration.

(4) The leading edge portion and the tailing edge portion of the separation zone, that is, the diluted fractions from the tailing edge portion of the component B-rich fraction to the leading edge portion of the component A-rich fraction are recycled; as a result, the component A-rich fraction and the component B-rich fraction can be recovered in relatively high concentration.

The method of the present invention will be explained in more detail.

At first, a column equipped with a filter plate at the bottom is packed with a cation exchange resin in calcium form; then the feed solution or water is admitted through the specially located separate inlet to the column, whereby the feed solution carried along with the water stream is chromatographically separated into a component A-rich fraction and a component B-rich fraction.

Further, these fractions are sequentially separated into the following fractions at the point coming out of the column;

(a) the component A-rich fraction which has been separated sufficiently except the diluted leading edge fraction which is included in the (d) fraction described hereinafter, (b) the mixed fraction which has not been separated sufficiently, where the component composition is changing sequentially from the component A-rich fraction to the component B-rich fraction, (c) the component B-rich fraction which has been separated sufficiently except the diluted tailing edge fraction which is included in the (d) fraction described below, and (d) the diluted fraction from the tailing edge portion following the component B-rich fraction to the leading edge portion coming out before the component A-rich fraction in the next cycle.

Then, taking into consideration the liquid composition (the concentration distribution) profile of the moving stream in the column, the position of the inlet for water is so selected that at the time when the (a) or (c) fraction flows out of the column, the concentration of the components is at its lowest (most dilute) at the water inlet in the column, Also the inlet for the feed solution is positioned at that point in a column wherein the liquid composition shows the maximum concentration of components A and B or the ratio of the components A to B in the liquid composition of the stream is substantially equal to that of the feed solution.

At the end of the inlets, distribution nozzles are installed to admit the feed solution and water uniformly into the column.

The bottom of the column is equipped with a flow meter which measures the accumulative flow rate of the effluent from the column.

In operation, after the flow meter measures the present volume of each fraction, a signal is sent to the valve controller which controls following operations:

The present volume of each fraction has been predetermined to maintain the purity and adequate concentration of the (a) and (c) fractions.

In the first step, discharging of the (a) fraction from the bottom the column and admitting of water or the feed solution through the respective inlets above described are carried out at the same time. Next, when the flow meter measures the preset volume of the (a) fraction a signal is sent to the valve controller, thereby the discharge of the (a) fraction and admittance of water or the feed solution are stopped at the same time and instantly the (b) fraction is returned to the top of the column through a pump without storing and after the present volume of the (b) fraction has been recycled, the valve controller operates to stop the recycle of the (b) fraction and to start discharging of (c) fraction and simultaneously admitting of the water or the feed solution through the respective inlets. Thereafter when the flow meter measures the present volume of the (c) fraction, a signal is sent to the valve controller, and the discharge of the (c) fraction and admittance of water or the feed solution are stopped, and the (d) fraction is recycled to the column in the same way as the (b) fraction. At the last when the preset volume of the (d) fraction has been measured by the flow meter, a cycle of the separation process has been completed and the valve controller starts the next cycle and repeats the same operation in a cyclic manner.

It is preferred to attach a liquid concentration detector in the pipe at the bottom of the column to know the concentration of the displacing separation zone and the profile of each fraction, whereby the volume of each fraction can be controlled to keep the operation in a normal state.

EXAMPLE 1

With reference to FIG. 1, an apparatus is used having a cylindrical column 10 which is 0.8 M in diameter and 10 M long. The column is equipped with filter plate "11" to retain and to support adsorbent. At 1.75 M and 2.5 M from the top of the column, inlets W and R were made for water and feed solution, respectively; each has its own solenoid valves "18" and "19". At the end of the inlet pipes, distribution nozzles were installed to feed the feed solution and water to the column separately. At the bottom of the column, a pipe was connected with flow meter "12", which leads to an outlet valve "14" for (a) fraction (rich in glucose), an outlet valve "15" for (c) fraction (rich in fructose) and a valve "16" for circulation through pump "17" to the top of the column.

The flow meter "12" indicated accumulative flow rate until reaching a preset volume which signals a valve controller "13" to make same work.

As the adsorbent, Duolite C-20X4 cation exchange resin (30–50 mesh) in calcium form was filled to 5 $M^3$ capacity, immersed in water (deionized water). The feed solution contained 50 wt.% dry substance, of which 42% was fructose, 55% glucose and 8% oligosaccharides. The column was maintained at 60° C. The operation of the set up is summarized in TABLE I.

TABLE I

| Fraction | Order Valve Open | Preset Volume By Flow Meter |
|---|---|---|
| a | 18, 14 | 520 liter |
| b | 16 | 1840 liter |
| c | 19, 15 | 340 liter |
| d | 16 | 1300 liter |

As valves "18" and "14" opened, water was fed to the column and the (a) fraction rich in glucose came out of the bottom. When the flow meter "12" indicated 520 liters, a signal was sent to the valve controller "13", whereby the valves "18" and "14" were shut off and the valve "16" was opened simultaneously; thus (b) fraction was pumped through the pump "17" and recycled back to the column.

After 1840 liters has been recycled, the valve "16" was closed and the valves "15" and "19" opened for discharging the (c) fraction rich in fructose while feeding in the raw material, feed solution. When the flow meter "12" indicated 340 liter, the valve controller "13" was triggered to close the valve "15" and "19" and to valve open "16" to recycle the (d) fraction back to the top of the column. When 1300 liters of the (d) fraction had been recycled, the valve "16" was closed and "14" and "18" opened for the next cycle to repeat the operation.

Figure 2:
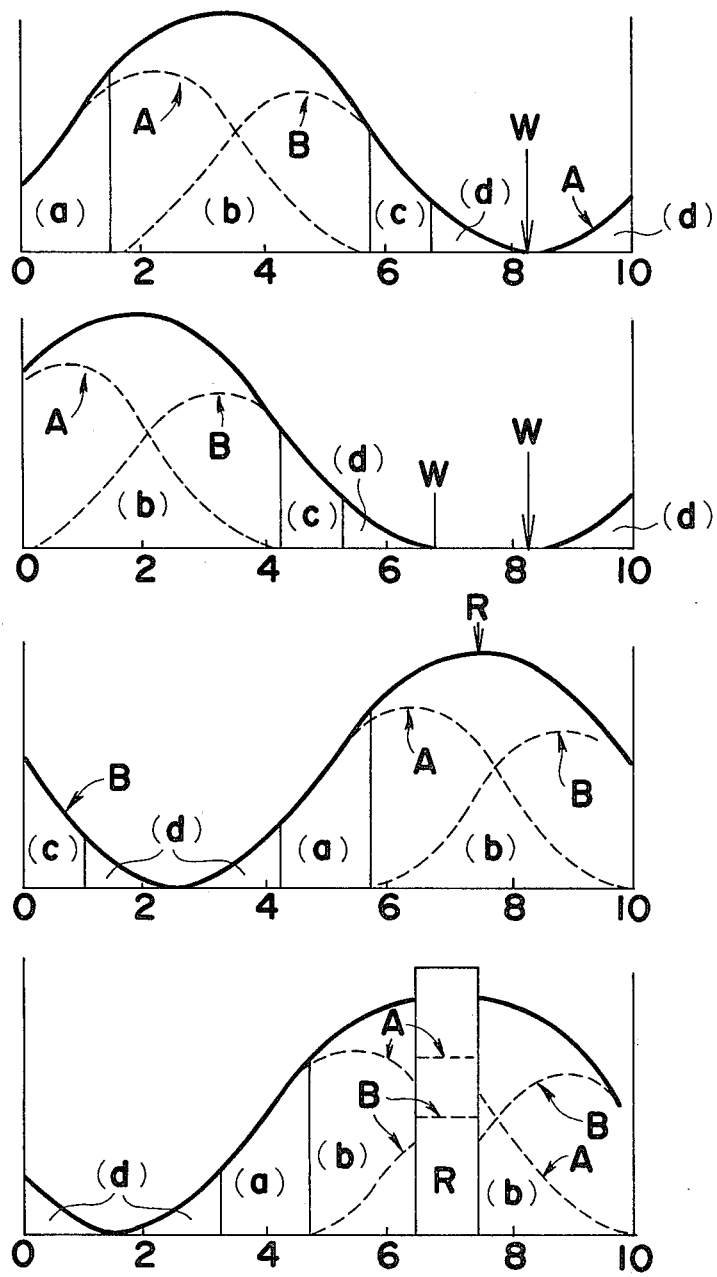
FIG. 2 graphically represents each mode of change of the concentration distribution of solution in the column in Example 1. The abscissa represents the column height in meters from the bottom, the ordinate sugar concentration (%), A represents glucose and oligomers, B is fructose, W is desorbent (water) inlet, R is feed solution inlet, and (a), (b), (c), and (d) are the respective fractions.

The flow rate was adjusted to 1.25 $M^3$/hr. The concentration change of streams in the column was determined as shown in FIGS. 2 I–IV. The result of operations was shown in TABLE II. The yield of 96% fructose was 557 kg per day.

TABLE II

| | Volume Liter/ Day | Concent. Wt. % | Water Kg/ Day | Dry Substance Kg/Day | | |
|---|---|---|---|---|---|---|
| | | | | Fructose | Glucose (Etc.) | Total |
| Feed | 2,580 | 50 | 1,585 | 666 | 919 | 1,585 |
| Water | 3,840 | 0 | 3,840 | 0 | 0 | 0 |
| Fructose (c fraction) | 2,580 | 20.2 | 2,230 | 540 | 17 | 557 |
| Glucose and Oligomers (a fraction) | 3,840 | 24.4 | 3,187 | 126 | 902 | 1,028 |

EXAMPLE 2

Figure 3:
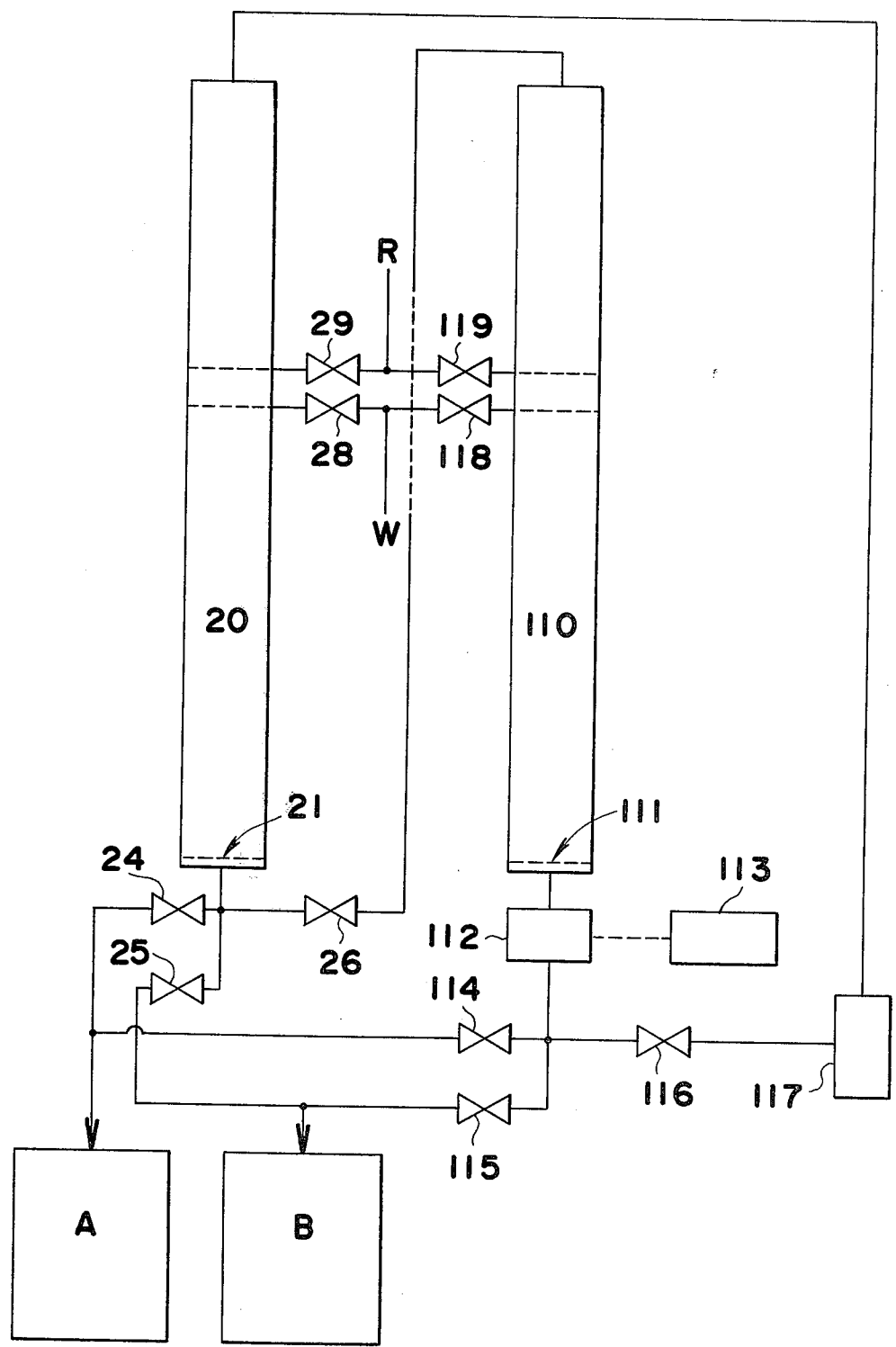
FIG. 3 is a diagrammatic view of the apparatus used in Example 2.

A system with two columns as shown in FIG. 3 was used in Example 2. Both columns "110" and "20" were the same size as that of Example 1, and were connected to each other to make a circulating system. Both columns had feed-solution inlets located 3.8 M from the top of column and water inlet 4.2 M from the top of the column. The inlet pipes were connected to valves "119" and "29" and "118" and "28" for the feed-solution and water, respectively.

In the Figure, the numbers "111"–"117" correspond to the designated items "11"–"17" in FIG. 1, "21" represents a filter plate, "24" a valve for (a) fraction outlet, "25" a valve for (c) fraction outlet, and "26" a circulation valve, respectively. For this example, an anion exchange resin (Amberlite IRA-411 in chloride form) of 30–40 mesh was used. Five $M^3$ of resin was packed in each column.

The feed solution used was 50 wt. % dry substance of High Maltose Corn Syrup saccharified by Beta-amylase. Its sugar content was glucose 6.1%, maltose 39.0%, maltotriose 14.5%, and Beta-limit dextrin and others 40.4%. Deionized water was used for the desorbent. The flow rate was set at 1.5 M³/hr. Temperature was maintained at 60° C.

The system was operated according to the order described in Table III.

TABLE III

| Fraction | | Valve Opened | Preset Volume By Flow meter |
|---|---|---|---|
| Column #110 | Column #20 | | |
| c | d | 115, 29, 26 | 160 liter |
| c | a | 115, 29, 24, 118 | 680 liter |
| c | b | 115, 29, 26 | 160 liter |
| d | b | 116, 26 | 2,000 liter |
| d | c | 25, 119, 116 | 160 liter |
| a | c | 25, 119, 114, 28 | 680 liter |
| b | c | 25, 119, 116 | 160 liter |
| b | d | 116, 26 | 2,000 liter |

The method of operation was similar to that of Example 1. It was slightly complicated by the doubling of every fraction. The operation results are shown in Table IV. Separation of a low viscosity syrup mainly consisting of maltose from dextrin at relatively high concentration was clearly demonstrated.

TABLE IV

| | Volume l/Day | wt. % | Water Kg/Day | Dry Substance Kg/Day | | | | |
|---|---|---|---|---|---|---|---|---|
| | | | | Glucose | Maltose | Maltotriose | Dextrin | Total |
| Feed | 12,000 | 50 | 7,374 | 182 | 3,145 | 1,069 | 2,978 | 7,374 |
| Water | 8,160 | 0 | 8,160 | — | — | — | — | — |
| Maltose as Main Component (c fraction) | 12,000 | 31.9 | 8,795 | 172 | 2,925 | 962 | 124 | 4,183 |
| Dextrin (a fraction) | 8,160 | 32.4 | 6,739 | 10 | 220 | 107 | 2,854 | 3,191 |

EXAMPLE 3

Figure 4:
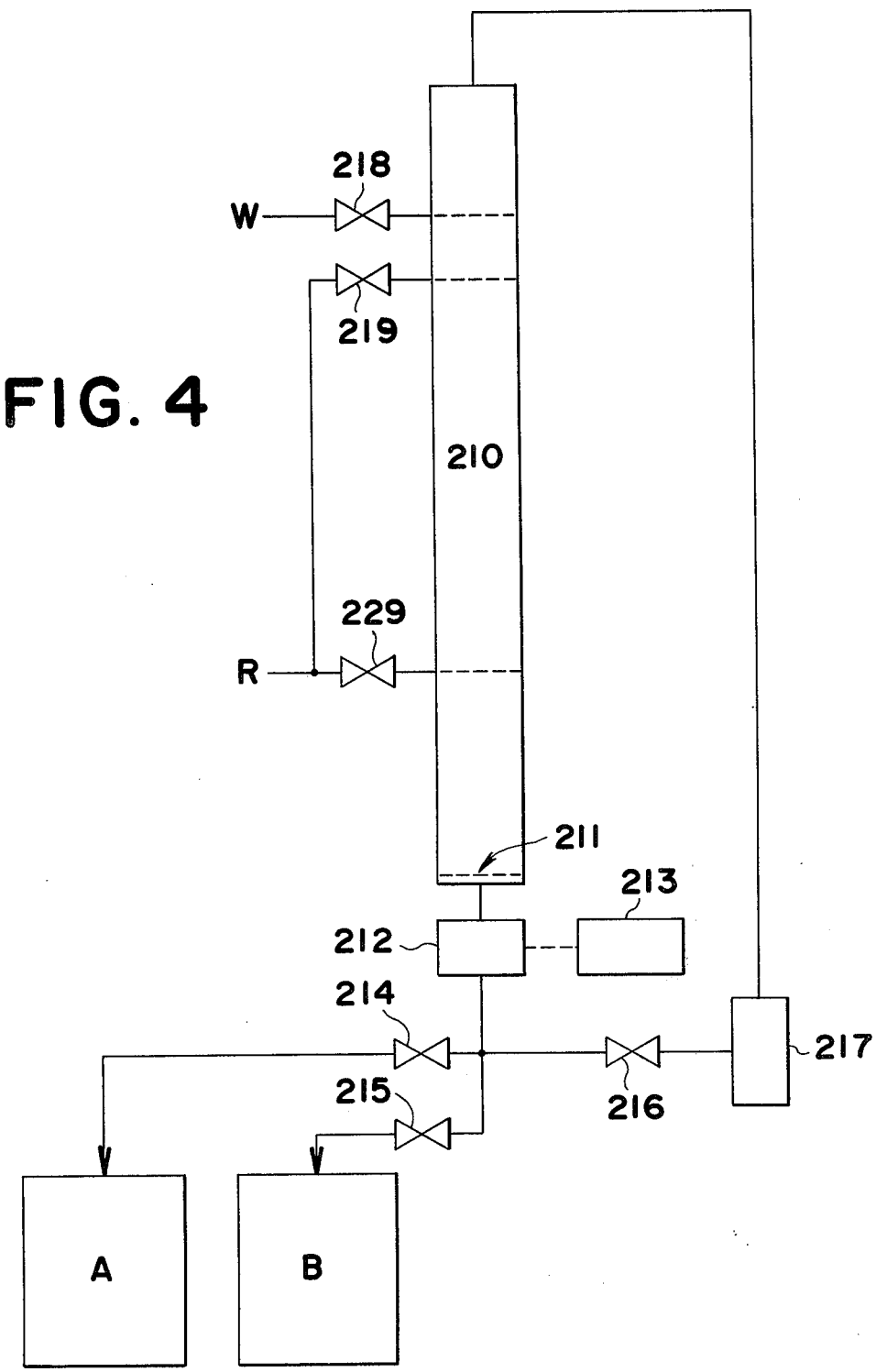
FIG. 4 is a diagrammatic view of the apparatus used in Example 3.

As shown in FIG. 4, the column used was the same size to that of Example 1, and had inlets 2.5 M and 7.5 M from the top of column. The upper inlet had solenoid valves "218" and "219" for water and the feed solution, respectively, and lower inlet for the feed solution had a solenoid valve "229".

In FIG. 4, the numbers "210"-"217" "10"-"17" in the FIG. 1, and "229" represents a feed inlet valve. The feed solution and other operating conditions were the same to those of Example 1. But in this example, the ratio of the feed solution to water was not the same as that of Example 1. The amount of water used in one cycle was decreased from 520 liter to 430 liters and the feed solution increased from 340 liters to 430 liters.

The method of operation was the same as that of Example 1 except the (a) fraction was carried out in two steps as shown in Table V. The operation results are shown in Table VI.

The yield of 92% fructose was 720 kg per day, and the water used was decreased.

TABLE V

| Fraction | Order Valve Open | Preset Volume By Flow Meter |
|---|---|---|
| a | 229, 214 | 90 liter |
| a | 218, 214 | 430 liter |
| b | 216 | 1,920 liter |
| c | 219, 215 | 340 liter |
| d | 216 | 1,350 liter |

TABLE VI

| | Volume Liter/Day | Conc. Wt. % | Water Kg/Day | Dry Substance Kg/Day | | |
|---|---|---|---|---|---|---|
| | | | | Fructose | Glucose Etc. | Total |
| Feed Solution | 3,124 | 50 | 1,925 | 809 | 1,116 | 1,925 |
| Water | 3,124 | 0 | 3,124 | 0 | 0 | 0 |
| Fructose (c fraction) | 2,513 | 25.8 | 2,082 | 663 | 57 | 720 |
| Glucose and Oligomers (a fraction) | 3,735 | 28.7 | 2,967 | 146 | 1,059 | 1,205 |

EXAMPLE 4

Figure 5:
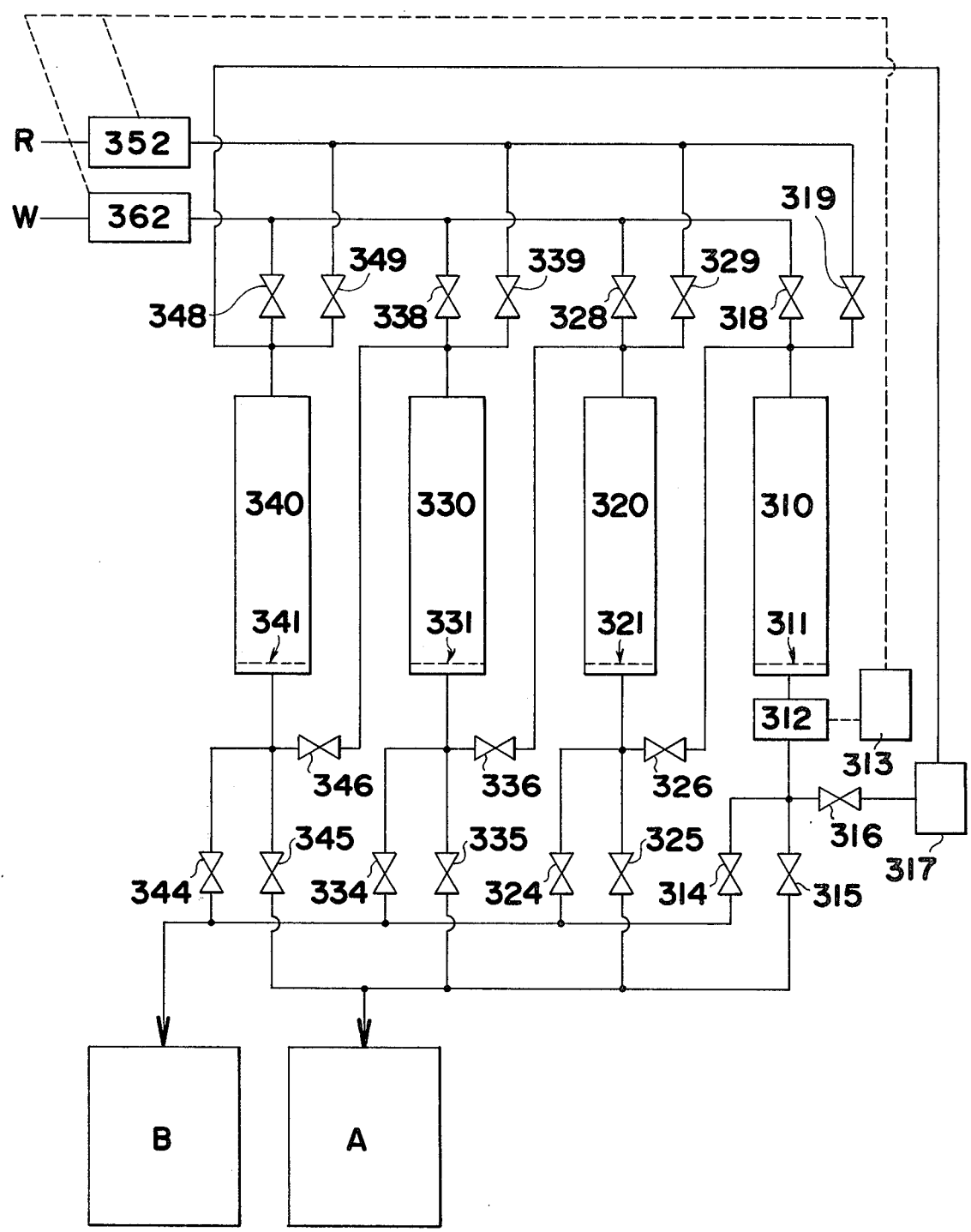
FIG. 5 is a diagrammatic view of the apparatus used in Example 4.

As shown in FIG. 5, a system with four columns was used in this Example.

The four columns "310", "320", "330", and "340" were each 0.8 M in diameter and 2.6 M long. Each of the columns was equipped with filter plates "311", "321", "331" and "341", respectively, to retain and to support the adsorbent. The columns were connected into one circulating system.

At the top of each of the columns the fresh solution feed valves "319", "329", "339" and "349" were connected to the fresh solution feed R through flow meter "352", and also the desorbent water feed valves "318", "328", "338" and "348" were connected to the desorbent water feed W through flow meter "362".

At the bottom of each of the columns, discharge valves "314", "324", "334" and "344" for (c) fraction, discharge valves "315", "325", "335" and "345" for (d) fraction, and the connecting valves "316", "326", "336" and "346" for circulation to the next column were installed. Circulation was controlled, through a flow meter "312" at the bottom of the column "310". Flow goes from connecting valve "316" to circulation pump "317".

The flow meters "352", "362" and "312" indicated accumulative flow rate until reaching a preset volume which signaled the a valve controller "313" to operate the indicated valve.

Other conditions were the same as those of Example 1. The operation of the setup is summarized in Table VII.

TABLE VII

| Step | Fraction Column "310" | Fraction Column "320" | Fraction Column "330" | Fraction Column "340" | Valve Open | Preset Volume of Flow Meter (l) "312" | Preset Volume of Flow Meter (l) "352" | Preset Volume of Flow Meter (l) "362" |
|---|---|---|---|---|---|---|---|---|
| 1 | — | (a) | — | (c) | "329" "325" "348" "344" | — | 160 | 118 |
| 2 | — | (a) | — | — | "348" "346" "336" "325" | — | — | 42 |
| 3 | (b) | (b) | (d) | (d) | "346" "336" "326" "316" | 770 | — | — |
| 4 | (a) | — | (c) | — | "319" "315" "338" "334" | — | 160 | 118 |
| 5 | — | — | (a) | — | "338" "336" "326" "315" | — | — | 42 |
| 6 | (b) | (b) | (d) | (d) | "346" "336" "326" "316" | 770 | — | — |
| 7 | — | (c) | — | (a) | "349" "345" "328" "324" | — | 160 | 118 |
| 8 | — | — | — | (a) | "328" "326" "316" "345" | — | — | 42 |
| 9 | (b) | (d) | (d) | (b) | "346" "336" "326" "316" | 770 | — | — |
| 10 | (c) | — | (a) | — | "339" "335" "318" "314" | — | 160 | 118 |
| 11 | (a) | — | — | — | "318" "316" "346" "335" | — | — | 42 |
| 12 | (d) | (d) | (b) | (b) | "346" "336" "326" "316" | 770 | — | — |

In the Step 1, valves "329", "325", "348" and "344" were opened, and the fresh solution 160 liter measured by flowmeter "352" was fed into column "320" and 160 liter of (a) fraction (High Purity of Glucose and Oligosaccharides) was discharged to tank A. And also the desorbent water 118 liter measured by flowmeter "362" was fed into column "340" and 118 liter of (c) fraction (High Purity Fructose) was discharged to tank B.

Then in Step 2, the valves "348", "346", "336" and "325" were opened, and desorbent water, 42 liters, measured by flowmeter "362" was fed into column "340" and through valve "346", column "330", valve "336" and column "320" 42 liter of (a) fraction was discharged to tank A. Total of these two steps is Fresh solution feed—160 liter
Desorbent water feed—118+42=160 liter
(a) Fraction—160+42=202 liter
(c) Fraction—118 liter Then in Step 3, the valves "346", "336", "326" and "316" were opened and 770 liters measured by flowmeter "312" was circulated through all columns by circulating pump "317".

In the same manner, Step 4, followed and then through steps 4–11, to Step 12, when one cycle was finished. The same operations were repeated in a cyclic manner.

The result of these operations is shown in Table VIII, the yield of 93% fructose from the feed solution of isomerized sugar containing 42% fructose, 50% glucose and 8% oligosaccharides was 1,313 Kg per day and the desorbent water used was 5,485 Kg per day.

TABLE VIII

| | Volume Liter/ Day | Concentration % | Water Kg/ Day | Dry Substance Kg/Day Fructose | Dry Substance Kg/Day Glucose Oligosaccharides | Dry Substance Kg/Day Total |
|---|---|---|---|---|---|---|
| Feed solution | 5,485 | 50.0 | 3,379 | 1,419 | 1,960 | 3,379 |
| Desorbent water | 5,485 | 0 | 5,485 | 0 | 0 | 0 |
| (c) Fraction | 3,949 | 29.5 | 3,139 | 1,221 | 92 | 1,313 |
| (a) Fraction | 7,021 | 26.5 | 5,725 | 198 | 1,868 | 2,066 |

What is claimed is:

1. A method for the chromatographic separation of each of the soluble components of a feed solution containing as major components (1) a component A which is relatively less adsorbed by a solid adsorbent having ion-exchanging or molecular sieve action and (2) a component B which is more selectively adsorbed by the solid adsorbent having ion-exchanging or molecular sieve action, said solid adsorbent having its adsorbency restored by displacing the selectively adsorbed components, said method comprising:

sequentially introducing said feed solution and a liquid desorbent into a column packed with said solid adsorbent;

thereafter separating effluent at the bottom of said column in one cycle of operation into four fractions, including
(a) a fraction rich in said component A,
(b) a mixed fraction containing both of said components A and B but with incremental increases in the concentration of said component B,
(c) a fraction rich in said component B, and
(d) a dilute fraction of the tailing edge portion of said fraction (c) and the leading edge portion of said fraction (a) in the next cycle of operation;

directly returning said fractions (b) and (d) to the top of said column;

feeding additional fresh feed solution to said column through a position on said column located at or approximately at a point where the liquid composition in said column has a maximum concentration of components A and B or the ratio of component A to component B in the liquid composition is substantially equal to that of said feed solution during effluence of said fraction (a) or (c);

feeding additional fresh liquid desorbent to said column through a position on said column located at or approximately at a point where the liquid composition in said column has a lowest concentration during effluence of said fraction (a) or (c); and separately recovering said fractions (a) and (c).

2. A method for the chromatographic separation of each of the soluble components of a feed solution containing as major components (1) a component A which is relatively less adsorbed by a solid adsorbent having ion-exchanging or molecular sieve action and (2) a component B which is more selectively adsorbed by said solid adsorbent having ion-exchanging or molecular sieve action, said solid adsorbent having its adsorbency restored by displacing the selectively adsorbed components, where the chromatographic separation is carried out in a circulating system comprised of at least one column packed with said solid adsorbent and wherein each column in said system has a single, fixed outlet for withdrawal of both a major component A-rich fraction and a major component B-rich fraction, and through which fixed outlet fractions other than the major component fractions are recycled to said circulating system, which method comprises the steps of:

A. establishing within said circulating system a component concentration distribution comprising, sequentially: a major component A-rich fraction, fraction (a); a first mixed fraction containing component A and component B, fraction (b); a major component B-rich fraction, fraction (c); and a second mixed fraction containing component A and component B, fraction (d), intermediate to fraction (c) and fraction (a), B. withdrawing each major component fraction through the outlet immediately downstream in the circulating system from the position of that major component fraction in the component concentration distribution, and concurrently adding, while withdrawing each volume of said major component A-rich fraction and said major component B-rich fraction, at least one of the two liquids (1) solvent for component A and component B and (2) feed solution, said solvent being added at a position adjacent to fraction (d) and said feed solution being added at a position adjacent to fraction (b), C. directly recycling fractions (b) and (d) downstream in the circulating system along with added solvent and/or solution thereby re-establishing the component concentration distribution, D. repeating steps B and C in a cyclic manner with each major component fraction being withdrawn through an outlet downstream in the circulating system to the outlet through which that major component fraction was last withdrawn.

3. The method of claim 2 wherein component A is glucose and component B is fructose and wherein said solvent is added while withdrawing fraction (a) and said feed solution is added while withdrawing fraction (c).

4. The method of claim 3 wherein the circulating system is comprised of two columns and wherein fraction (a) is withdrawn during the time fraction (c) is withdrawn.

5. The method of claim 3 wherein the circulating system is comprised of four columns, the withdrawal of fraction (c) takes place during the time fraction (a) is withdrawn, and wherein fraction (c) is withdrawn through the second outlet immediately posterior to the outlet through which fraction (a) is withdrawn.

* * * * *